(12) United States Patent
Ganapathi et al.

(10) Patent No.: US 9,496,970 B2
(45) Date of Patent: Nov. 15, 2016

(54) METHOD AND APPARATUS OF HANDLING IN-DEVICE CO-EXISTENCE INTERFERENCE IN A MULTI-RADIO ENVIRONMENT

(75) Inventors: Sarvesha Anegundi Ganapathi, Bangalore (IN); Satish Nanjunda Swamy Jamadagni, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 381 days.

(21) Appl. No.: 13/884,167

(22) PCT Filed: Nov. 8, 2011

(86) PCT No.: PCT/KR2011/008480
§ 371 (c)(1),
(2), (4) Date: May 8, 2013

(87) PCT Pub. No.: WO2012/064093
PCT Pub. Date: May 18, 2012

(65) Prior Publication Data
US 2013/0231148 A1   Sep. 5, 2013

(30) Foreign Application Priority Data

Nov. 8, 2010  (IN) .......................... 3325/CHE/2010

(51) Int. Cl.
*H04B 15/00*   (2006.01)
*H04W 88/06*   (2009.01)
(Continued)

(52) U.S. Cl.
CPC ............ *H04B 15/00* (2013.01); *H04B 1/1027* (2013.01); *H04B 1/3805* (2013.01);
(Continued)

(58) Field of Classification Search
CPC .... H04B 15/00; H04B 1/525; H04B 1/1027; H04B 1/3805; H04J 11/0066; H04J 11/0036; H04W 72/02; H04W 88/06

USPC ..................... 455/501, 63.1, 278.1
See application file for complete search history.

(56) References Cited

U.S. PATENT DOCUMENTS

| 7,929,997 B2 * | 4/2011 | Saito ................... H04B 1/1027 455/278.1 |
| 8,204,036 B2 | 6/2012 | Russell et al. |

(Continued)

FOREIGN PATENT DOCUMENTS

| CN | 101622802 A | 1/2010 |
| JP | 2009-284432 A | 12/2009 |

(Continued)

OTHER PUBLICATIONS

Huawei et al., Consideration on the details of in-device interference, 3GPP TSG RAN WG2 Meeting #71bis, R2-105587, Oct. 11-15, 2010.

(Continued)

*Primary Examiner* — MD Talukder
(74) *Attorney, Agent, or Firm* — Jefferson IP Law, LLP

(57) ABSTRACT

A method and apparatus of handling in-device co-existence interference in a multi-radio environment are provided. The method includes measuring an adjacent band interference value indicating an amount of adjacent band interference in a Long Term Evolution (LTE) band associated with an LTE radio entity prior to switching the LTE radio entity to an active state from an inactive state, comparing the adjacent band interference value with a predetermined threshold value, and reporting in-device co-existence interference in the LTE band to an evolved Node B (eNB) according to an outcome of the comparing of the adjacent band interference value with the predetermined threshold value.

19 Claims, 7 Drawing Sheets

(51) Int. Cl.
*H04J 11/00* (2006.01)
*H04B 1/10* (2006.01)
*H04B 1/3805* (2015.01)
*H04B 1/525* (2015.01)
*H04W 72/02* (2009.01)

(52) U.S. Cl.
CPC ....... *H04J 11/0036* (2013.01); *H04J 11/0066* (2013.01); *H04W 88/06* (2013.01); *H04B 1/525* (2013.01); *H04W 72/02* (2013.01)

(56) References Cited

U.S. PATENT DOCUMENTS

| | | | |
|---|---|---|---|
| 2008/0205365 A1 | 8/2008 | Russell et al. | |
| 2008/0231254 A1* | 9/2008 | Kanoh | G01R 23/165 324/76.19 |
| 2008/0261531 A1* | 10/2008 | Huang | H04W 72/005 455/63.1 |
| 2009/0061806 A1* | 3/2009 | Saito | H04B 1/109 455/296 |
| 2009/0213773 A1 | 8/2009 | Yoon et al. | |
| 2010/0003925 A1* | 1/2010 | Fujita | H04W 24/08 455/67.13 |
| 2010/0172254 A1* | 7/2010 | Sachs | H04W 48/18 370/252 |
| 2010/0197235 A1 | 8/2010 | Wilhelmsson | H04W 52/243 455/63.3 |
| 2011/0243047 A1* | 10/2011 | Dayal | H04W 16/14 370/311 |
| 2011/0312342 A1* | 12/2011 | Eguchi | H04L 1/0026 455/456.1 |
| 2012/0289278 A1* | 11/2012 | Huschke | H04W 52/146 455/522 |
| 2012/0320890 A1* | 12/2012 | Zhang | H04L 1/004 370/338 |
| 2013/0137435 A1* | 5/2013 | Shi | H04W 36/20 455/436 |
| 2013/0231148 A1* | 9/2013 | Ganapathi | H04B 15/00 455/501 |
| 2013/0242919 A1* | 9/2013 | Koo | H04W 72/082 370/329 |

FOREIGN PATENT DOCUMENTS

| | | |
|---|---|---|
| JP | 2013-536634 A | 9/2013 |
| WO | 2010/051191 A1 | 5/2010 |
| WO | 2010/089281 A1 | 8/2010 |
| WO | 2011/123535 A1 | 10/2011 |
| WO | 2012/019369 A1 | 2/2012 |

OTHER PUBLICATIONS

Samsung, Possible TDM Solution for LTE, WiFi and BT in device Coexistence, 3GPP TSG RAN WG2 Meeting #71bis, R2-105572, Oct. 11-15, 2010.
Ericsson et al., Methods for in-device coexistence interference avoidance, 3GPP TSG RAN WG2 Meeting #71bis, R2-105743, Oct. 11-15, 2010.
Samsung, Possible FDM solution for in-device coexistence interference mitigation, 3GPP TSG RAN WG2 Meeting #71bis, R2-105573, Oct. 11-15, 2010.
Samsung: "Understanding the nature of issues related with in-device coexistence", 3GPP Draft; R2-104329, 3rd Generation Partnership Project (3GPP), Mobile Competence Centre; 650, Route Des Lucioles; F-06921 Sophia-Antipolis Cedex; France vol. RAN WG2, No. Madrid, Spain; 20100823, Aug. 17, 2010, XP050451828.

* cited by examiner

METHOD AND APPARATUS OF HANDLING IN-DEVICE CO-EXISTENCE INTERFERENCE IN A MULTI-RADIO ENVIRONMENT

PRIORITY

This application is a National Stage application under 35 U.S.C. §371 of an International application filed on Nov. 8, 2011 and assigned application No. PCT/KR2011/008480, and claims the benefit under 35 U.S.C. §365(b) of an Indian patent application filed in the Indian Industrial Property Office on Nov. 8, 2010 and assigned Serial No. 3325/CHE/2010, the entire disclosure of which is hereby incorporated by reference.

BACKGROUND OF THE INVENTION

1. Field of the Invention

The present invention relates to wireless communication systems. More particularly, the present invention relates to a method and apparatus of handling in-device co-existence in a multi-radio environment.

2. Description of the Related Art

Coexistence of Long Term Evolution (LTE) with the Industrial, Scientific and Medical (ISM) band technologies, such as Bluetooth, Wi-Fi and the like, and Global Navigation Satellite Systems (GNSS) should be provided as these technologies and systems are becoming very common combinations in User Equipment (UE), such as cell phones, or any other similar and/or suitable electronic device. These technologies may be developed by different groups to serve different purposes, and accordingly, characteristics of each of these technologies may be different. For example, the different technologies and systems may operate in different frequencies, have different access mechanisms, have different frame structures, and peak transmit powers, as well as any other similar differences in operations and characteristics.

An LTE band 7 Uplink (UL) and a Bluetooth band are separated by a 20 MHz frequency band. The LTE band 7 is a Frequency Division Duplexing (FDD) band and hence an LTE receiver is not affected by a Bluetooth transmitter whereas the LTE transmitter may affect a Bluetooth receiver. Also, there is a separation of 2 MHz between an LTE band 40, which is a Time Division Duplexing (TDD) band, and the Bluetooth band. Therefore, it may be difficult to discontinue using a higher portion of the LTE band 40 in a case of coexistence of an LTE system and a Bluetooth system.

FIG. 1A is a schematic diagram illustrating separation between an LTE band and a Bluetooth band according to the related art.

Referring to FIG. 1A, there are 14 channels demarcated in an ISM band for a Wi-Fi operation. Each channel is separated from an adjacent channel by 5 MHz, with an exception of channel number 14 which is separated by 12 MHz. Channel 1 of the LTE band 40 starts with 2401 MHz, and hence there is almost no separation between the LTE band 40 and a Wi-Fi band. Channel 14 of the Wi-Fi band ends at 2495 MHz, so there may only be a 5 MHz separation between an LTE band 7 and the Wi-Fi band. Different countries have different policies for a number of allowed channels of the Wi-Fi band. Currently, many countries allow channels 1 to 13, whereas Japan allows usage of a channel number 14 for IEEE 802.11b based communications. This suggests that, even though in theory there may be only 5 MHz separation between the Wi-Fi band and the LTE band 7, in practice at least 17 MHz is available.

FIG. 1B is a schematic diagram illustrating separation between an LTE band and a Wi-Fi band according to the related art.

Referring to FIG. 1B, in a case of co-existence of an LTE system with a Worldwide Interoperability for Microwave Access (WiMax) system, in-device co-existence interference may exist between an LTE radio entity and a WiMax radio entity when a 10 Mhz band is used for WiMax communication and another 10 Mhz band is used for LTE communication. As the two bands are different, possibility of in-device co-existence interference between the WiMax radio entity and the LTE radio entity is low. However, in-device co-existence interference may arise due to leakage in a radio filter and per-sub-carrier side lobes may not fall relatively slowly.

FIG. 1C is a schematic diagram illustrating separation between the LTE band and the WiMax band according to related art.

Referring to FIG. 1C, the co-existence of the WiMax radio entity with the LTE radio entity is shown. As can be seen from FIG. 1C, a Downlink (DL) part of the WiMax radio entity overlaps with the uplink part of the LTE radio entity, resulting in high amount of interference despite maintaining synchronization between frame boundaries. Accordingly, there is a need for a method and apparatus of handling in-device co-existence in a multi-radio environment.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. When technologies including Long Term Evolution (LTE), Industrial, Scientific and Medical (ISM) band technologies, Bluetooth, Wireless Fidelity (Wi-Fi), Worldwide Interoperability for Microwave Access (WiMax), Global Navigation Satellite Systems (GNSS) and any other similar technology operate simultaneously in an adjacent band having a small separation between bands, e.g., <20 MHz, usually 50 decibels (dB) isolation is needed. However, small form factors of a User Equipment (UE) may provide only 10-30 dB isolation. As a result, a transmitter of one radio may affect a receiver of another radio. For example, a small form factor of the UE may cause interference from transmission using ISM technology to the receiver of cellular technologies such as LTE or WiMax. Similarly, the transmitter of cellular technology may cause interference to the ISM receiver. The main cause of in-device co-existence issues may be because of receiver blocking due to a limited dynamic range of a power amplifier, an analog to digital converter and an out of band emission due to imperfect filtering.

An aspect of the present invention is to provide a method and apparatus of handling in-device co-existence interference in a multi-radio environment.

In accordance with an aspect of the present invention a method of handling in-device co-existence interference in a User Equipment (UE) having multiple radio entities is provided. The method includes measuring an adjacent band interference value indicating an amount of adjacent band interference in a Long Term Evolution (LTE) band associated with an LTE radio entity prior to switching the LTE radio entity to an active state from an inactive state, comparing the adjacent band interference value with a predetermined threshold value, and reporting in-device co-existence interference in the LTE band to an evolved Node B (eNB) according to an outcome of the comparing of the adjacent band interference value with the predetermined threshold value.

In accordance with an aspect of the present invention an apparatus for handling in-device co-existence interference in a UE having multiple radio entities is provided. The apparatus includes a processor, and a memory coupled to the processor, wherein the memory comprises an interference management module configured for measuring an adjacent band interference value indicating an amount of adjacent band interference in an LTE band associated with an LTE radio entity prior to switching the LTE radio entity to an active state from an inactive state, comparing the adjacent band interference value with a predetermined threshold value, and reporting in-device co-existence interference in the LTE band to an eNB according to an outcome of the comparing of the adjacent band interference value with the predetermined threshold value.

In accordance with an aspect of the present invention a system for handling in-device co-existence interference in a UE having multiple radio entities is provided. The system includes an LTE radio entity including a first radio filter and a second radio filter, an ISM radio entity, and a coordinator handling the in-device co-existence interference in the UE having the LTE radio entity and the ISM radio entity, wherein the coordinator is configured for measuring an adjacent band interference value indicating an amount of adjacent band interference in an LTE band associated with the LTE radio entity prior to switching the LTE radio entity to an active state from an inactive state, comparing the adjacent band interference value with a predetermined threshold value, and reporting in-device co-existence interference in the LTE band to an eNB according to an outcome of the comparing of the adjacent band interference value with the predetermined threshold value.

In accordance with an aspect of the present invention a method of handling in-device co-existence interference in a UE is provided. The method includes receiving a notification from an ISM radio entity disposed in the UE, the notification indicating that the ISM radio entity is going to initiate an ISM activity in an ISM band, determining whether any LTE activity is ongoing in an LTE band during an active state of an LTE radio entity, applying a first radio filter to the LTE band during the active state of the LTE radio entity if it is determined that there is no LTE activity ongoing in the LTE band during the active state of the LTE radio entity, and applying a second radio filter to the LTE band, wherein the second filter resolves in-device co-existence interference between the ISM radio entity and the LTE radio entity when the LTE activity and the ISM activity are ongoing at a substantially simultaneous time if it is determined that there is LTE activity ongoing in the LTE band during the active state of the LTE radio entity.

In accordance with an aspect of the present invention an apparatus for handling in-device co-existence interference in a UE having multiple radio entities is provided. The apparatus includes a processor, and a memory coupled to the processor, wherein the memory comprises an interference management module configured for receiving a notification from an ISM radio entity indicating that the ISM radio entity is going to initiate an ISM activity in an ISM band, determining whether any LTE activity is ongoing in an LTE band during an active state of an LTE radio entity, applying a first radio filter to the LTE band during the active state of the LTE radio entity if it is determined that there is no LTE activity ongoing in the LTE band during the active state of the LTE radio entity, and applying a second radio filter to the LTE band, wherein the second filter resolves in-device co-existence interference between the ISM radio entity and the LTE radio entity when the LTE activity and the ISM activity are ongoing at a substantially simultaneous time if it is determined that there is LTE activity ongoing in the LTE band during the active state of the LTE radio entity.

In accordance with an aspect of the present invention a system for handling in-device co-existence interference in a UE having multiple radio entities is provided. The system includes a LTE radio entity including a first radio filter and a second radio filter, an ISM radio entity, and a coordinator handling the in-device co-existence interference in the UE having the LTE radio entity and the ISM radio entity, wherein the coordinator is configured for receiving a notification from the ISM radio entity indicating that the ISM radio entity is going to initiate an ISM activity in an ISM band, determining whether any LTE activity is ongoing in an LTE band during an active state of the LTE radio entity, applying the first radio filter to the LTE band during the active state of the LTE radio entity if it is determined that there is no LTE activity ongoing in the LTE band during the active state of the LTE radio entity, and applying the second radio filter to the LTE band, wherein the second filter resolves in-device co-existence interference between the ISM radio entity and the LTE radio entity when the LTE activity and the ISM activity are ongoing at a substantially simultaneous time if it is determined that there is LTE activity ongoing in the LTE band during the active state of the LTE radio entity.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, description of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
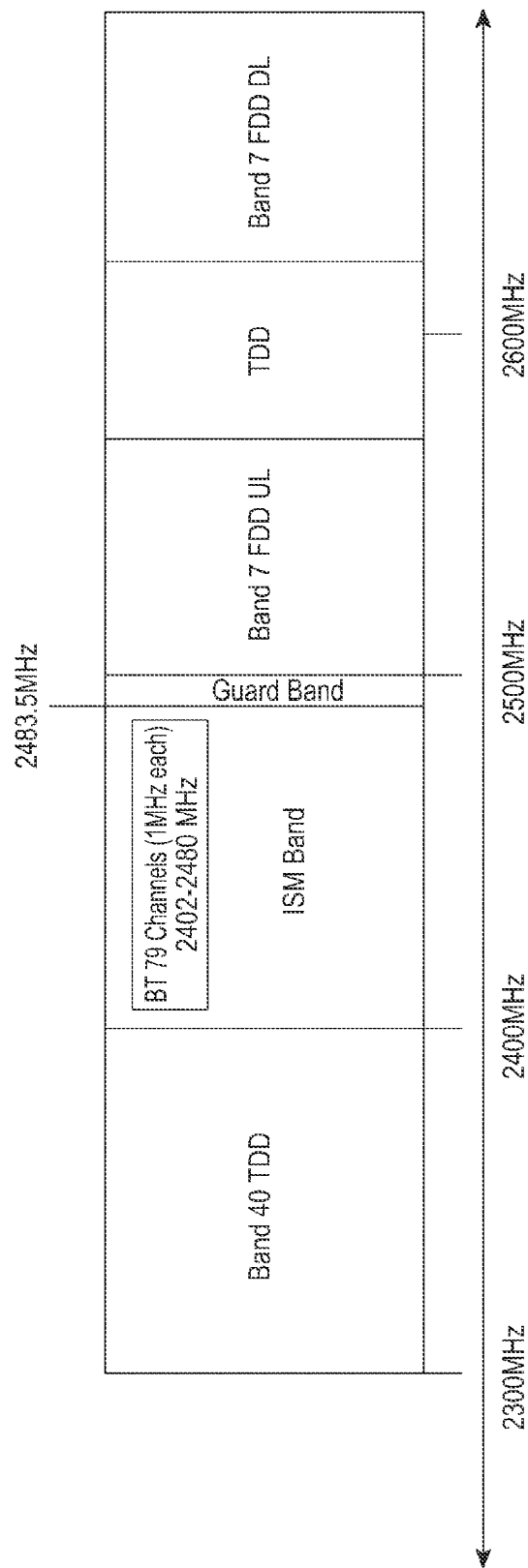
FIG. 1A is a schematic diagram illustrating separation between a Long Term Evolution (LTE) band and a Bluetooth band according to related art.
Figure 1B:
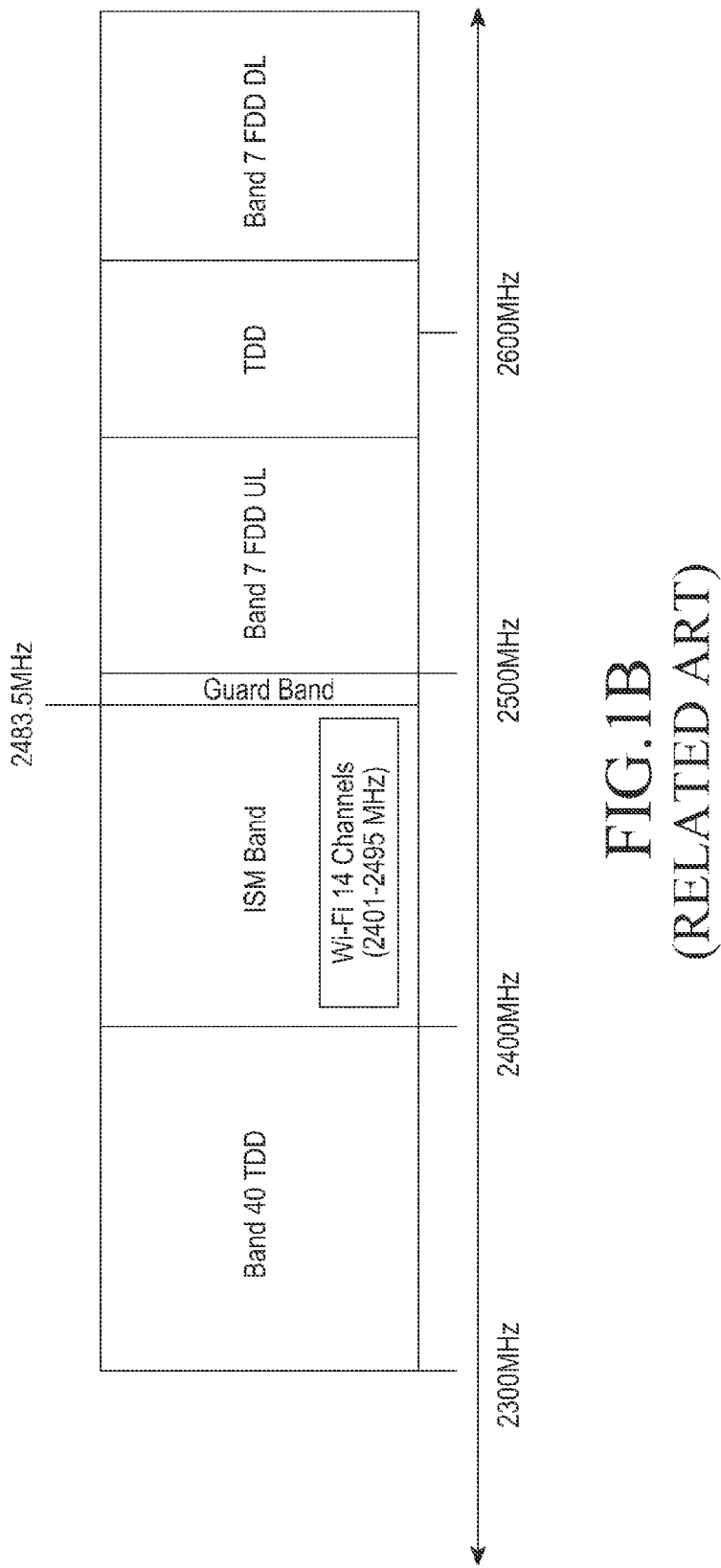
FIG. 1B is a schematic diagram illustrating separation between an LTE band and a Wireless Fidelity (Wi-Fi) band according to related art.
Figure 1C:
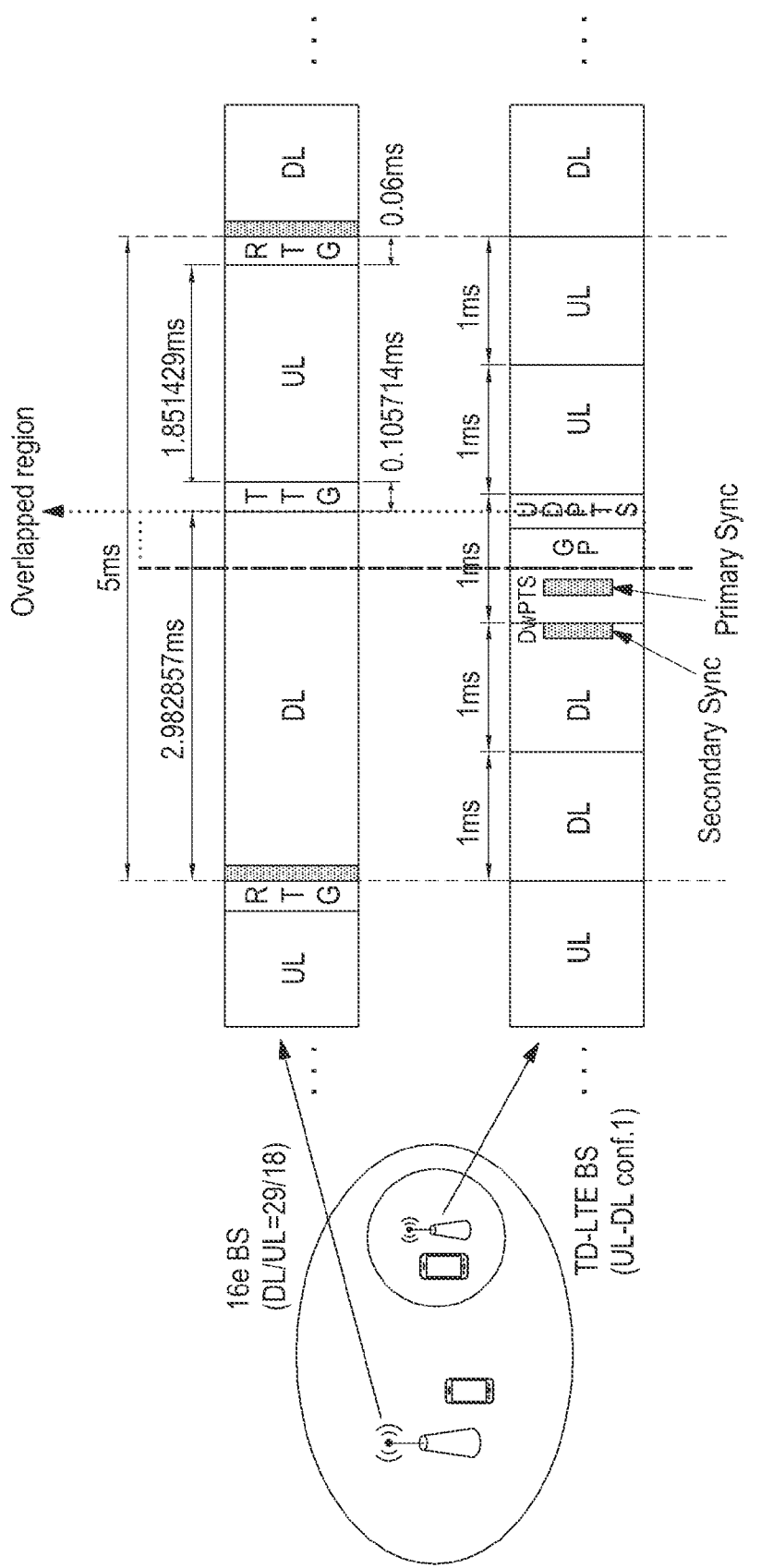
FIG. 1C is a schematic diagram illustrating separation between the LTE band and a Worldwide Interoperability for Microwave Access (WiMax) band according to related art.
Figure 2:
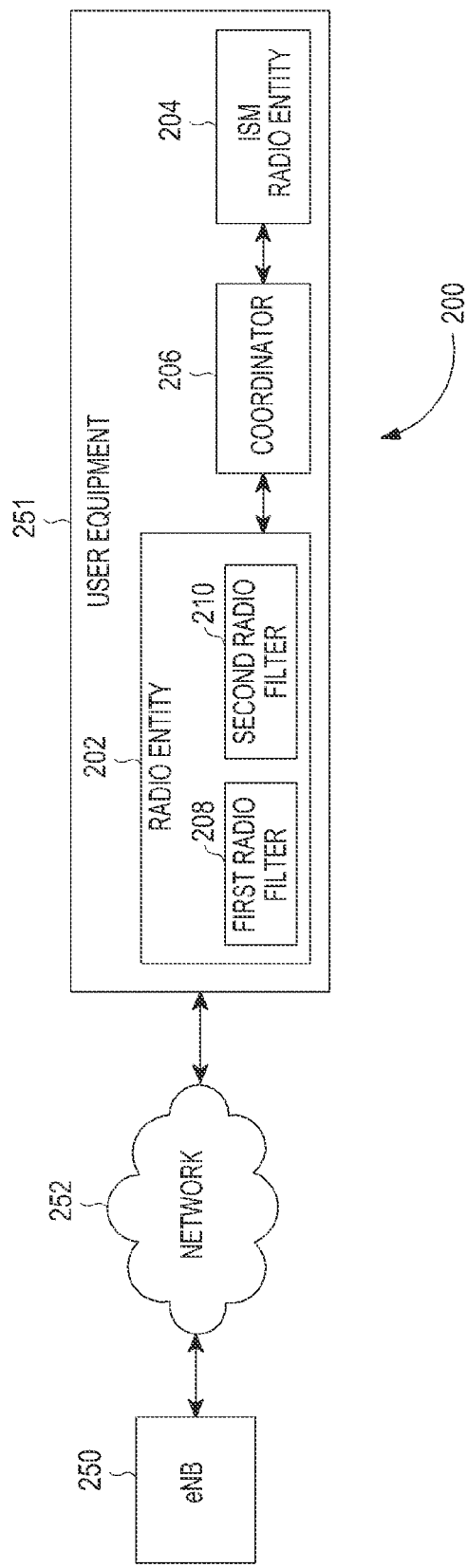
FIG. 2 illustrates a block diagram of a wireless communication system for handling in-device co-existence interference between an LTE radio entity and an Industrial, Scientific and Medical (ISM) radio entity in a User Equipment (UE) according to an exemplary embodiment of the present invention.

FIG. 2 illustrates a block diagram of a wireless communication system for handling in-device co-existence interference between a Long Term Evolution (LTE) radio entity and an Industrial, Scientific and Medical (ISM) radio entity in a User Equipment (UE) according to an exemplary embodiment of the present invention.

Referring to FIG. 2, a wireless communication system 200 includes a base station such as an Evolved Node B (eNB) 250 and a UE 251 connected via a wireless network 252, such as an LTE network. The UE 251 includes an LTE radio entity 202, an ISM radio entity 204, and a coordinator 206.

According to the present exemplary embodiment, the coordinator 206 handles in-device co-existence interference between the LTE radio entity 202 and the ISM radio entity 204. In an exemplary operation, the eNB 250 communicates a scheduling gap pattern having LTE ON and OFF periods to the UE 251 so that the LTE radio entity 202 operates during the LTE ON period. Accordingly, the coordinator 206 configures the LTE radio entity 202 so that the LTE radio entity 202 performs data transmission/reception during the LTE ON period, which may also be referred to as an active state, and the ISM radio entity 204 can perform any ISM activity during the LTE OFF period, which may also be referred to as inactive state. In such a case, a possibility of the LTE radio entity 202 causing interference to the ISM radio entity 204 or receiving interference from the ISM radio entity 204 is low. However, in-device co-existence interference may occur in the UE 251 when the ISM activity is ongoing using the ISM band and the LTE radio entity 202 is going to initiate an LTE activity using an LTE band. The in-device co-existence interference may also occur when the LTE activity is ongoing using the LTE band during the active state and the ISM radio entity 204 wishes to initiate an ISM activity using the ISM band.

According to the present exemplary embodiment, the coordinator 206 is configured to handle such interference between the ISM radio entity 204 and the LTE radio entity 202 using radio filters such as a first radio filter 208 and a second radio filter 210 in the LTE radio entity 202, where the first radio filter 208 is applied to an entirety of the LTE band, e.g., an entirety of the 20 MHz band of the LTE band, and the second radio filter 210 is applied to a partial LTE band with high attenuation at the edges of the LTE band. The first and second radio filters 208 and 210 are applied appropriately on the LTE band according to a need for filtering. It is appreciated that, the first and second radio filters 208 and 210 may be realized through hardware, software or combination of both. The process steps of handling in-device co-existence interference in the UE 251 by the coordinator 206 are described in greater detail with reference to FIGS. 3 and 4.

When the UE 251 includes a Worldwide Interoperability for Microwave Access (WiMax) radio entity (not shown) and the LTE radio entity 202, then the coordinator 206 applies the second radio filter 210 to resolve in-device co-existence interference between the WiMax radio entity and the LTE radio entity 202. By use of the second filter 210, the WiMAX radio entity can perform data activity using central sub-bands in the overlapping region, thereby making optimal use of the frequency band. Alternatively, the in-device co-existence between the WiMax radio entity and the LTE radio entity 202 may be resolved by avoiding transmission of data in a Downlink (DL) in an overlapping region.

Figure 3:
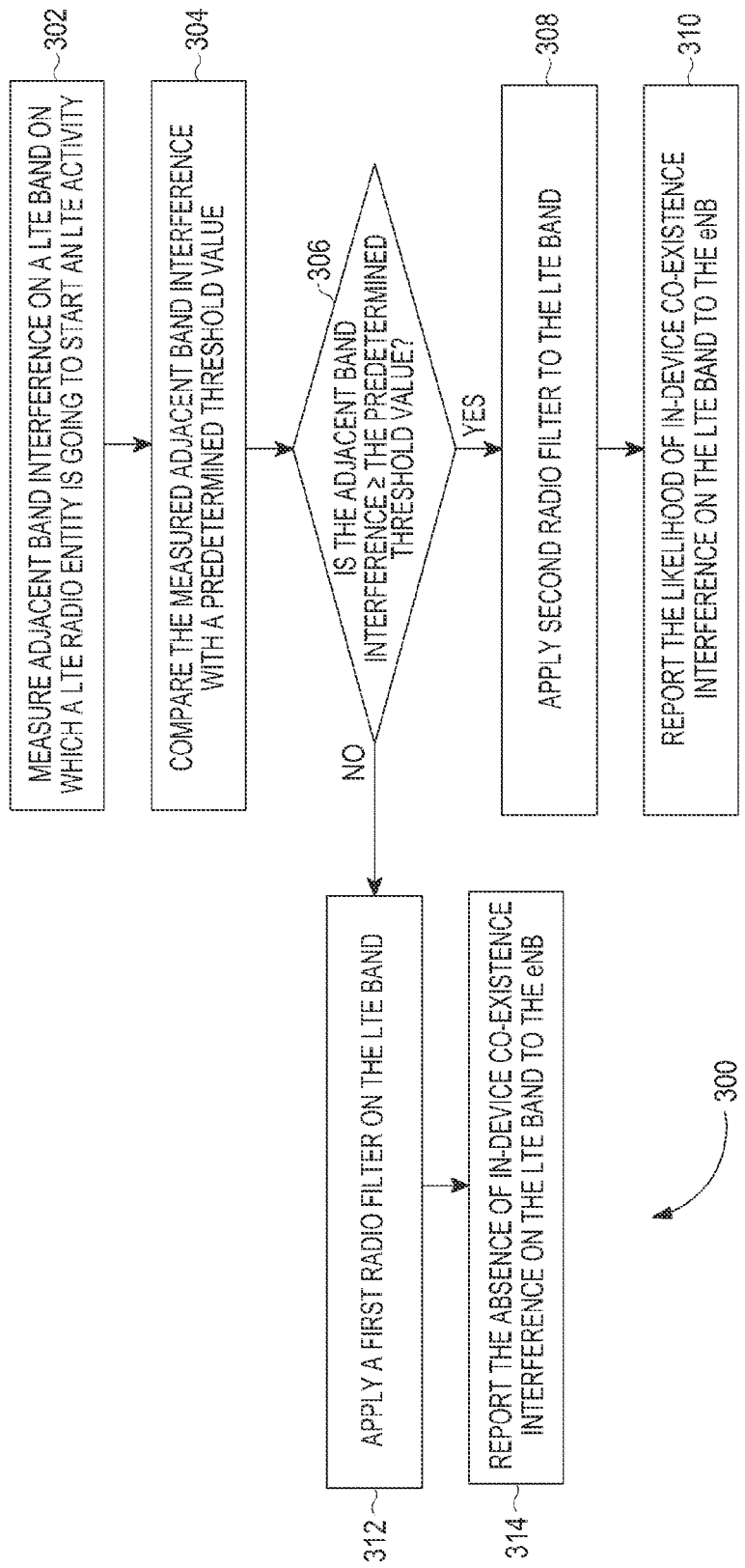
FIG. 3 is a process flowchart illustrating an exemplary method of handling in-device co-existence interference between an LTE radio entity and an ISM radio entity according to an exemplary embodiment of the present invention.

FIG. 3 is a process flowchart illustrating an exemplary method of handling in-device co-existence interference between an LTE radio entity and an ISM radio entity according to one exemplary embodiment of the present invention.

Referring to FIG. 3, process steps 302-314 of a process 300 illustrate a method of handling in-device co-existence interference when ISM activity is ongoing and the LTE radio entity 202 is going to commence an LTE activity in an LTE band. At step 302, adjacent band interference is measured in the LTE band on which the LTE radio entity 202 is going to commence an LTE activity. The adjacent band interference is measured in the LTE band prior to switching the LTE radio entity 202 to an active state from an inactive state. The adjacent band interference helps determine whether any interference exists in the LTE band. In other words, the adjacent band interference indicates that no ISM activity is ongoing in the ISM band when the LTE radio entity 202 transitions to the active state from the inactive state by measuring power levels in the LTE band.

At step 304, the measured adjacent band interference is compared with a predetermined threshold value in order to determine a level of interference that may affect operations of the LTE radio entity 202 during the active state. At step 306, it is determined whether the adjacent band interference is greater than or equal to the predetermined threshold value. If the adjacent band interference is greater than or equal to the predetermined threshold value, then the ISM radio entity 204 is assumed to be operating in the ISM band when the adjacent band interference was measured. If it is determined that the adjacent band interference is greater than or equal to the predetermined threshold value, then at step 308, the LTE radio entity 204 applies the second radio filter 210 to the LTE band. As the first radio filter 208 covers the entirety of the LTE band, the adjacent band interference measured during the inactive state of the LTE radio entity 202 indicates a state of the ISM radio entity 204. More particularly, with respect to step 308, if the adjacent band interference is greater than the predetermined threshold value, then the LTE radio entity 202 applies the second radio filter 210 to the LTE band, and otherwise, the LTE radio entity 202 continues using the first radio filter 208. The second radio filter 210 covers a part of the LTE band having high attenuation at the edges of the LTE band and eliminates high interference and subsequent radio blocking when the ISM band is operating in the ISM band simultaneously to the LTE radio entity 202 operating in the LTE band.

At step 310, a likelihood of in-device co-existence interference in the LTE band is reported to the eNB 250. According to an exemplary embodiment, the in-device co-existence interference is reported to the eNB 250 in a Layer 2 and/or Layer 3 signaling message. The signaling message indicates that the ISM radio entity 204 is operating in the ISM band and also indicates that the second radio filter 210 is applied to the LTE band due to the presence of adjacent band interference. Additionally, the signaling message may request that the eNB 250 not transmit data packets on edge sub-bands of the LTE band since the ISM activity is ongoing. This may prevent interference between the LTE radio entity 202 and the ISM radio entity 204. For example, the signaling message may be a Radio Resource Control (RRC) connection request message, an RRC connection setup complete message or an RRC connection reconfiguration complete message, or any other similar and/or suitable type of message.

If, at step 306, it is determined that the adjacent band interference is less than the predetermined threshold value, then the ISM radio entity 204 is assumed to be not operating in the ISM band when the adjacent band interference was measured. In such a case, at step 312, the first radio filter 208 is applied to the entirety of the LTE band. At step 314, absence of in-device co-existence interference in the LTE band is reported to the eNB 250. According to an exemplary embodiment, the absence of in-device co-existence interference is reported to the eNB 250 in the Layer 2 and/or Layer 3 signaling message. The signaling message indicates that the ISM radio entity 204 is not operating in the ISM band and also indicates that the first radio filter 208 is applied to the LTE band due to the absence of in-device co-existence interference. Additionally, the signaling message may request that the eNB 250 transmit data packets on edge sub-bands of the LTE band since the ISM radio entity is not operational. For example, the signaling message may be an RRC connection request message, an RRC connection setup complete message, an RRC connection reconfiguration complete message, or any other similar and/or suitable type of message.

Figure 4:
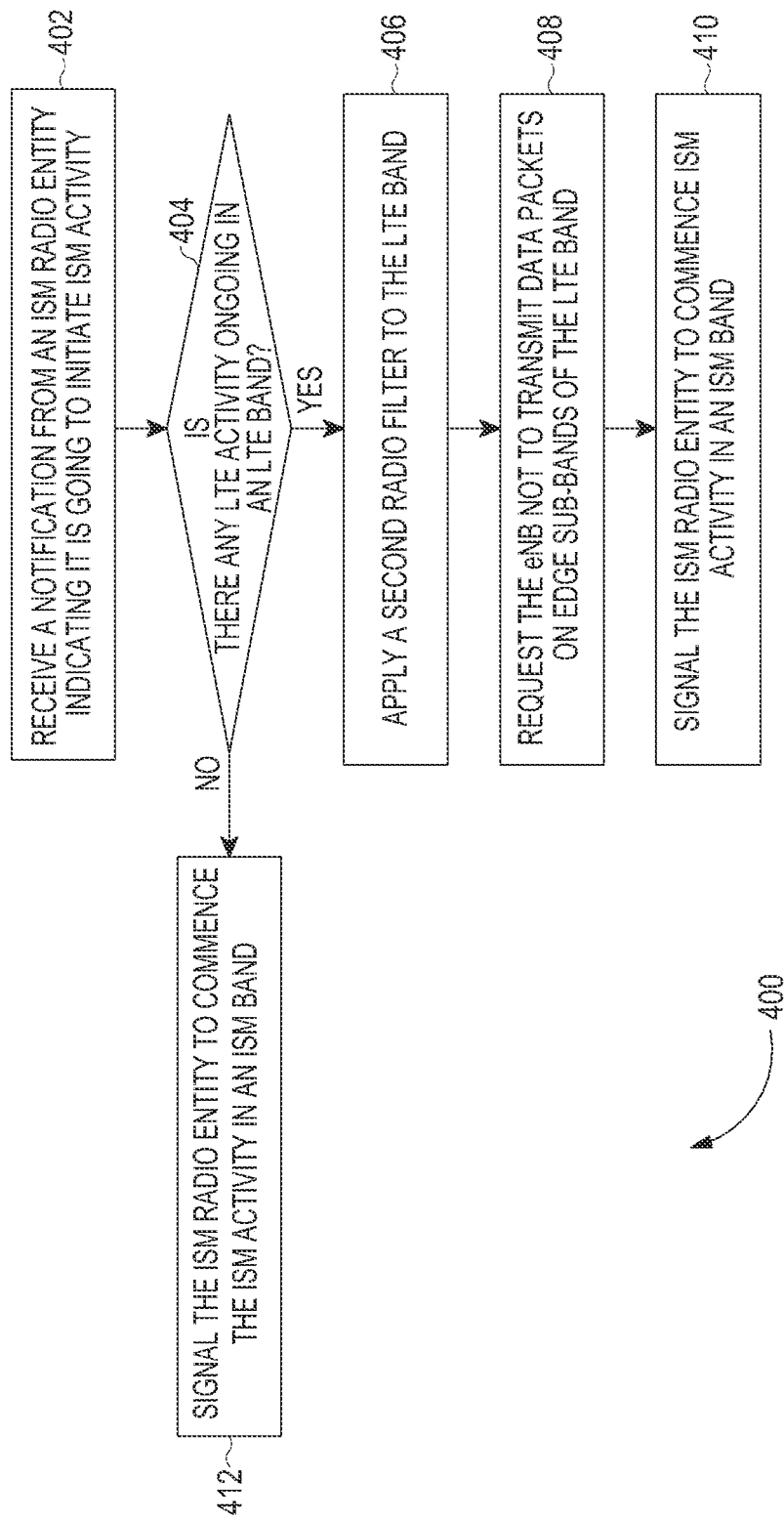
FIG. 4 is a process flowchart illustrating an exemplary method of handling in-device co-existence interference between an LTE radio entity and an ISM radio entity according to an exemplary embodiment of the present invention.

FIG. 4 is a process flowchart illustrating an exemplary method of handling in-device co-existence interference between an LTE radio entity and an ISM radio entity according to another exemplary embodiment of the present invention.

Referring to FIG. 4, steps of a process flowchart 400 illustrate a method of handling in-device co-existence interference when LTE activity is ongoing and the ISM radio entity 204 is going to commence ISM activity in an ISM band. When the ISM radio entity 204 is going to commence ISM activity in an ISM band while LTE activity is ongoing, then, at step 402, a notification is received from the ISM radio entity 204 indicating that it is going to initiate an ISM activity in the ISM band. Next, at step 404, it is determined whether any LTE activity is ongoing in the LTE band during an active state of the LTE radio entity 202. If there is any ongoing LTE activity, then at step 406, the second radio filter 210 is applied to the LTE band.

At step 408, the eNB 250 is requested not to transmit data packets on edge sub-bands of the LTE band during the active state of the LTE radio entity 202. Also, the eNB 250 may be signaled that the second radio filter 210 is applied to the LTE band during the active state. At step 410, the ISM radio entity 204 is signaled to commence the ISM activity in the ISM band during the active state of the LTE radio entity. If there is no ongoing LTE activity, as determined in step 404, then at step 412, the ISM radio entity 204 is signaled to initiate the ISM activity in the ISM band. The above indication may be signaled to the ISM radio entity in a Layer 2 and/or Layer 3 signaling message. For example, the above indication may be signaled in a Medium Access Control (MAC) control element, buffer status reporting message or any other similar and/or suitable message.

Figure 5:
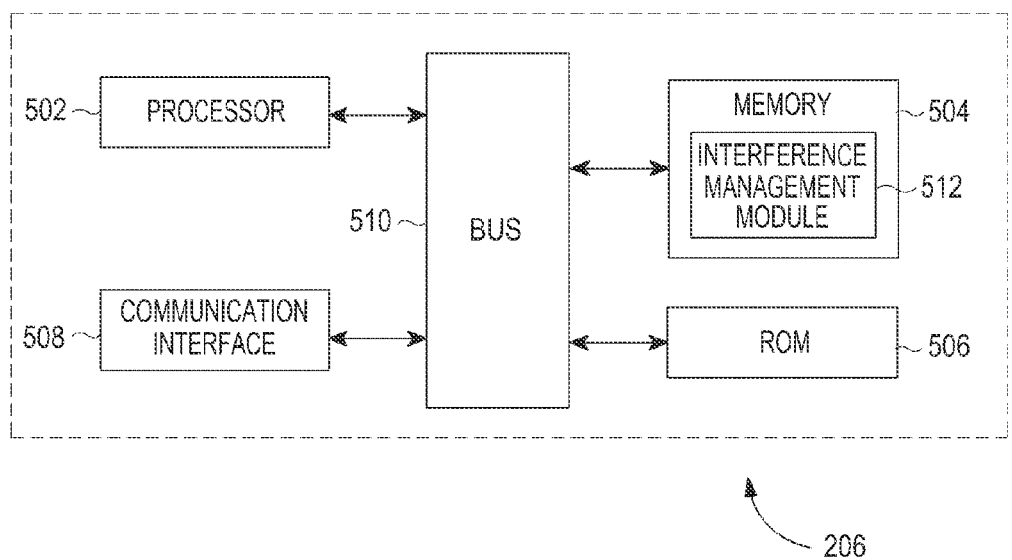
FIG. 5 illustrates a block diagram of a coordinator showing various components according to an exemplary embodiment of the present invention.

FIG. 5 illustrates a block diagram of a coordinator showing various components according to an exemplary embodiment of the present invention.

Referring to FIG. 5, a coordinator 206 includes a processor 502, a memory 504, a Read Only Memory (ROM) 506, a communication interface 508, and a bus 510.

The processor 502, as used herein, may be any type of computational circuit, such as, but not limited to, an Integrated Circuit (IC), and Application Specific IC (ASIC), a microprocessor, a microcontroller, a Complex Instruction Set Computing (CISC) microprocessor, a Reduced Instruction Set Computing (RISC) microprocessor, a very long instruction word microprocessor, an explicitly parallel instruction computing microprocessor, a graphics processor, a digital signal processor, or any other similar and/or suitable type of hardware that may be used as a processing circuit. The processor 502 may also include embedded controllers, such as generic or programmable logic devices or arrays, ASICs, single-chip computers, smart cards, and the like.

The memory 504 may be a volatile memory, a non-volatile memory, and a non-volatile computer readable storage medium. The memory 504 includes an interference management module 512 for handling in-device co-existence interference between the LTE radio entity 202 and the ISM radio entity 204, according to exemplary embodiments of the present invention. A variety of computer-readable storage media may be stored in and accessed from the memory elements. Memory elements may include any suitable memory device for storing data and machine-readable instructions, such as a Read Only Memory (ROM), a Random Access Memory (RAM), an Erasable Programmable Read Only Memory (EPROM), an Electrically EPROM (EEPROM), a hard drive, a removable media drive for handling memory cards, a Memory Stick, an optical drive, a magnetic drive, or any other similar and/or suitable non-volatile computer readable storage medium.

The present exemplary embodiments may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 502 or any other similar and/or suitable hardware included in the present exemplary embodiments. For example, a computer program may include machine-readable instructions capable of handling in-device co-existence interference between the LTE radio entity 202 and the ISM radio entity 204, according to the teachings and herein described exemplary embodiments. According to an exemplary embodiment, the computer program may be included on a storage medium and loaded from the storage medium to a hard drive in the non-volatile memory.

The present exemplary embodiments have been described with reference to the above included descriptions and FIGS. 2-5, however, it will be evident that various modifications and changes may be made to these exemplary embodiments without departing from the broader spirit and scope of the various exemplary embodiments. Furthermore, the various devices, modules, selectors, estimators, and the like described herein may be enabled and operated using hardware circuitry, for example, Complementary Metal Oxide semiconductor (CMOS) based logic circuitry, firmware, software and/or any combination of hardware, firmware, and/or software embodied in a non-volatile computer readable recording medium. For example, the various electrical structure and methods may be embodied using transistors, logic gates, and electrical circuits, such as an ASIC or any other similar and/or suitable type of hardware device, element or unit.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method of handling in-device co-existence interference in a user equipment (UE), the method comprising:
measuring, by the UE, an adjacent band interference value indicating an amount of adjacent band interference in a long term evolution (LTE) band related to an LTE radio entity prior to switching the LTE radio entity to an active state from an inactive state;
comparing, by the UE, the adjacent band interference value with a predetermined threshold value;
applying a filter to the LTE band based on a result of the comparing of the adjacent band interference value with the predetermined threshold value;
reporting, by the UE, information related to in-device co-existence interference in the LTE band to an evolved node B (eNB) based on a result of the comparing of the adjacent band interference value with the predetermined threshold value; and
receiving data according to the reported information.

2. The method of claim 1, wherein the comparing of the adjacent band interference value with the predetermined threshold value comprises:
determining whether the adjacent band interference value is greater than or equal to the predetermined threshold value;
transmitting an indication to the eNB that an industrial, scientific, and medical (ISM) radio entity is operating in an ISM band in response to the adjacent band interference value being greater than or equal to the predetermined threshold value; and
transmitting an indication to the eNB that the ISM radio entity is not operating in the ISM band in response to the adjacent band interference value being less than the predetermined threshold value.

3. The method of claim 2, wherein the transmitting of the indication to the eNB that the ISM radio entity is not operating in the ISM band comprises:
transmitting, to the eNB, an indication to transmit data packets in edge sub-bands of the LTE band.

4. The method of claim 3, wherein the transmitting of the indication to the eNB that the ISM radio entity is operating in the ISM band comprises:
transmitting, to the eNB, a message prohibiting the eNB from transmitting data packets in edge sub-bands of the LTE band.

5. The method of claim 1, further comprising:
applying a first radio filter to the LTE band in response to the adjacent band interference value being less than the predetermined threshold value; and
indicating, to the eNB, that the first filter is applied to the LTE band.

6. The method of claim 1, further comprising:
applying a second radio filter to the LTE band in response to the adjacent band interference value being greater than or equal to the predetermined threshold value; and
indicating, to the eNB, that the second filter is applied to the LTE band.

7. A user equipment (UE) for handling in-device co-existence interference, the UE comprising:
a coordinator comprising a processor,
wherein the processor of the coordinator is configured to:
measure an adjacent band interference value indicating an amount of adjacent band interference in a long term evolution (LTE) band related to an LTE radio entity prior to switching the LTE radio entity to an active state from an inactive state,
compare the adjacent band interference value with a predetermined threshold value, and
apply a filter to the LTE band based on a result of the comparing of the adjacent band interference value with the predetermined threshold value,
report information related to in-device co-existence interference in the LTE band to an evolved node B (eNB) based on a result of the comparing of the adjacent band interference value with the predetermined threshold value, and
receive data according to the reported information.

8. The UE of claim 7, wherein the processor of the coordinator is further configured to:
determine whether the adjacent band interference value is greater than or equal to the predetermined threshold value,
transmit an indication to the evolved node B that an industrial, scientific, and medical (ISM) radio entity is operating in an ISM band in response to the adjacent band interference value being greater than or equal to the predetermined threshold value, and
transmit an indication to the evolved node B that the ISM radio entity is not operating in the ISM band in response to the adjacent band interference value being less than the predetermined threshold value.

9. The UE of claim 8, wherein the processor of the coordinator is further configured to:
send, to the eNB, an indication to transmit data packets in edge sub-bands of the LTE band.

10. The UE of claim 9, wherein the processor of the coordinator is further configured to:
send, to the eNB, a message prohibiting the eNB from transmitting data packets in edge sub-bands of the LTE band.

11. The UE of claim 7, wherein the processor of the coordinator is further configured to:
  apply a first radio filter to the LTE band in response to the adjacent band interference value being less than the predetermined threshold value, and
  indicate, to the eNB, that the first radio filter is applied to the LTE band.

12. The UE of claim 7, wherein the processor of the coordinator is further configured to:
  apply a second radio filter to the LTE band in response to the adjacent band interference value being greater than or equal to the predetermined threshold value, and
  indicate, to the eNB, that the second filter is applied to the LTE band.

13. The UE of claim 11, wherein the first radio filter is applied to an entirety of the LTE band.

14. The UE of claim 12, wherein the second radio filter is applied to edge sub-bands of the LTE band.

15. A user equipment (UE) for handling in-device co-existence interference, the UE comprising:
  a long term evolution (LTE) radio entity comprising:
    a first radio filter;
    a second radio filter;
    an industrial, scientific, and medical (ISM) radio entity; and
    a coordinator comprising a processor configured to handle the in-device co-existence interference in the UE having the LTE radio entity and the ISM radio entity,
  wherein the processor of the coordinator is further configured to:
    measure an adjacent band interference value indicating an amount of adjacent band interference in an LTE band related to the LTE radio entity prior to switching the LTE radio entity to an active state from an inactive state,
    compare the adjacent band interference value with a predetermined threshold value,
    apply one of the first radio filter and the second radio filter to the LTE band based on a result of the comparing of the adjacent band interference value with the predetermined threshold value,
    report information related to in-device co-existence interference in the LTE band to an evolved node B (eNB) based on a result of the comparing of the adjacent band interference value with the predetermined threshold value, and
    receive data according to the reported information.

16. The UE of claim 15, wherein the processor of the coordinator is further configured to:
  apply the first radio filter to the LTE band in response to the adjacent band interference value being less than the predetermined threshold value; and
  indicate, to the eNB, that the first filter is applied to the LTE band.

17. The UE of claim 15, wherein the processor of the coordinator is further configured to:
  apply the second radio filter to the LTE band in response to the adjacent band interference value being greater than or equal to the predetermined threshold value; and
  indicate, to the eNB, that the second filter is applied to the LTE band.

18. The UE of claim 16, wherein the first radio filter is applied to an entirety of the LTE band.

19. The UE of claim 17, wherein the second radio filter is applied to edge sub-bands of the LTE band.

* * * * *